United States Patent
Jeong et al.

(10) Patent No.: US 11,144,484 B2
(45) Date of Patent: Oct. 12, 2021

(54) METHOD AND ELECTRONIC DEVICE FOR TRANSCEIVING AUDIO SIGNAL

(71) Applicant: Samsung Electronics Co., Ltd., Gyeonggi-do (KR)

(72) Inventors: Jaecheon Jeong, Gyeonggi-do (KR); Hyunku Park, Gyeonggi-do (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 0 days.

(21) Appl. No.: 16/804,227

(22) Filed: Feb. 28, 2020

(65) Prior Publication Data

US 2020/0310999 A1 Oct. 1, 2020

(30) Foreign Application Priority Data

Apr. 1, 2019 (KR) .................. 10-2019-0037781

(51) Int. Cl.
*G06F 13/20* (2006.01)
*H04R 3/00* (2006.01)
*G06F 13/42* (2006.01)

(52) U.S. Cl.
CPC .......... *G06F 13/20* (2013.01); *G06F 13/4282* (2013.01); *H04R 3/00* (2013.01); *G06F 2213/0042* (2013.01); *H04R 2420/09* (2013.01)

(58) Field of Classification Search
CPC ....... G06F 13/20; G06F 13/4282; H04R 3/00; H04R 2213/0042
See application file for complete search history.

(56) References Cited

U.S. PATENT DOCUMENTS

2016/0246747 A1* 8/2016 Rand .................. G06F 13/122
2016/0271051 A1* 9/2016 Lee .................... A61K 8/9761
2016/0371051 A1 12/2016 Rowe et al.
(Continued)

FOREIGN PATENT DOCUMENTS

KR 10-2006-0083630 A 7/2006
KR 10-2017-0049958 A 5/2017
(Continued)

OTHER PUBLICATIONS

International Search Report dated Jun. 9, 2020.

*Primary Examiner* — Henry Tsai
*Assistant Examiner* — Christopher A Daley
(74) *Attorney, Agent, or Firm* — Cha & Reiter, LLC

(57) ABSTRACT

A method and electronic device for communicating audio signals with an audio input/output device is provided. The electronic device includes a USB type connection port, an audio processor configured to support conversion between a digital signal and an analog signal, and at least one processor configured to detect a connection of a peripheral device via the connection port, identify a type of the peripheral device, establish a first signal path for communicating the digital signal with the peripheral device through a first pin and/or a second pin included in the connection port based on whether the peripheral device supports a first mode, or establish a second signal path for communicating the analog signal with the peripheral device through the first pin and/or the second pin included in the connection port based on whether the peripheral device supports a second mode and whether a predetermined condition is satisfied.

15 Claims, 8 Drawing Sheets

(56) References Cited

U.S. PATENT DOCUMENTS

| | | |
|---|---|---|
| 2017/0127203 A1 | 5/2017 | Ryu |
| 2017/0262252 A1* | 9/2017 | Pelland .................. G06F 3/162 |
| 2017/0286360 A1 | 10/2017 | Srivastava |
| 2018/0173661 A1* | 6/2018 | Rand ........................ H04R 3/12 |
| 2019/0257869 A1 | 8/2019 | Lee et al. |

FOREIGN PATENT DOCUMENTS

| | | |
|---|---|---|
| KR | 10-2017-0098100 A | 8/2017 |
| KR | 10-2017-0120611 A | 10/2017 |
| KR | 10-2018-0045416 A | 5/2018 |

* cited by examiner

METHOD AND ELECTRONIC DEVICE FOR TRANSCEIVING AUDIO SIGNAL

CROSS-REFERENCE TO RELATED APPLICATION(S)

This application is based on and claims priority under 35 U.S.C. 119 to Korean Patent Application No. 10-2019-0037781 filed on Apr. 1, 2019, in the Korean Intellectual Property Office, the disclosures of which are herein incorporated by reference in their entireties.

BACKGROUND

1) Field

One or more disclosed embodiments generally relate to method and electronic device for communicating audio signals with an audio input/output device.

2) Description of Related Art

Recent development in the electronic communication industry has generated a popularization of portable electronic devices. Portable electronic devices may include not only mobile communication terminals but also various types of radio communication-enabled electronic devices, such as personal digital assistants (PDAs), smartphones, tablet personal computers (PCs), MP3 players, laptop PCs, digital cameras, wearable devices, etc., that enable users to communicate with other users while on the move.

Such an electronic device may include one or more ports (e.g., connection terminal) for wired connection with another device or peripheral device. These ports may be designed to meet the requirements of various standards. One of the most popular standards is universal serial bus (USB). USB, as one of the most popular standards for connecting peripheral devices to electronic devices, is expanding its reach into new application areas.

SUMMARY

One such peripheral devices is an audio input/output device for communicating audio signals with the electronic device via the USB interface. For example, the peripheral device may acquire a digital audio signal by processing an analog audio signal received via a microphone and send the digital audio signal to the electronic device via the USB interface. The peripheral device may also process a digital audio signal from the electronic device via the USB interface to output a corresponding analog audio signal via a speaker.

When the peripheral device is connected to the electronic device via the USB interface, the peripheral device may perform various functions by being powered by the electronic device. Accordingly, the electronic device is likely to consume more power for communicating digital audio signals with the peripheral device via the USB interface than for communicating analog audio signals with the peripheral device via a non-USB interface.

Furthermore, when the electronic device transmits or receives radio frequency (RF) signals with another peripheral device having an antenna, electromagnetic interference (EMI) generated from the USB communication may cause interference with the RF signals, leading to degradation of signal reception sensitivity.

According to a disclosed embodiment, an electronic device is provided. The electronic device includes a universal serial bus (USB) type connection port, a first audio processor configured to support conversion between a digital signal and an analog signal, and at least one processor configured to detect a connection of a peripheral device via the connection port, identify a type of the peripheral device, transmit and receive the digital signal with the peripheral device through a first signal path, in response to determining that the peripheral device supports a first mode based on the type of the peripheral device, and transmit and receive the analog signal with the peripheral device through a second signal path, in response to determining that the peripheral device additionally supports a second mode based on the type of peripheral device support, and satisfying a predetermined condition.

According to a disclosed embodiment, an electronic device is provided. The electronic device includes a universal serial bus (USB) type connection port, an audio input/output module configured to output a first audio signal or collect a second audio signal, an audio processor configured to convert a first digital signal received through the connection port to a first analog signal or convert a second analog signal received from the audio input/output module to a second digital signal, and a processor configured to select a first signal path or a second signal path based on a control signal received from the connection port, wherein the first signal path directly connects the connection port and the audio input/output module, and wherein the second signal path connects the connection port and the audio input/output module through the audio processor.

According to a disclosed embodiment, an audio signal communication method of an electronic device is provided. The method includes detecting a connection of an audio input/output device, identifying a type of the audio input/output device, communicating a digital signal with the audio input/output device through a first signal path, in response to determining that the peripheral device supports a first mode based on the type of the audio input/output device, and communicating analog signals with the audio input/output device through a second signal path, in response to determining that the peripheral device additionally supports a second mode based on the type of peripheral device support, and satisfying a predetermined condition.

Aspects of the disclosure are to address at least the above-mentioned problems and/or disadvantages and to provide at least the advantages described below. Other aspects, advantages, and salient features of the disclosure will become apparent to those skilled in the art from the following detailed description, which, taken in conjunction with the annexed drawings, discloses an embodiment of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

In the drawings, the same or similar reference numerals may be used for the same or similar components.

DETAILED DESCRIPTION

Figure 1:
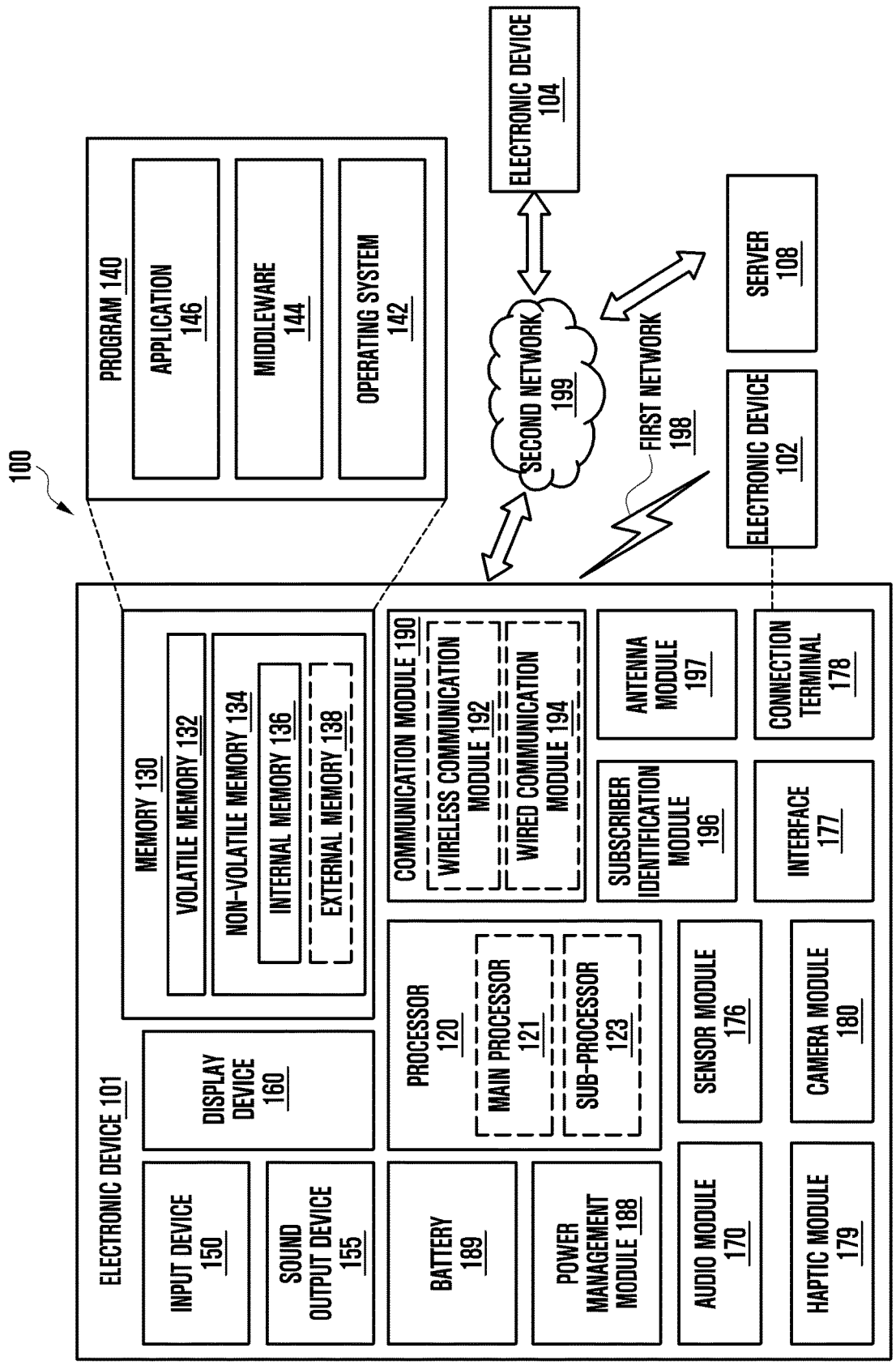
FIG. 1 is a block diagram illustrating a configuration of an electronic device in a network environment according to various disclosed embodiments.

FIG. 1 is a block diagram illustrating an electronic device 101 in a network environment 100 according to various embodiments. Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by other component (e.g., the processor 120) of the electronic device 101, from the outside (e.g., a user) of the electronic device 101. The input device 150 may include, for example, a microphone, a mouse, a keyboard, or a digital pen (e.g., stylus pen).

The sound output device 155 may output sound signals to the outside of the electronic device 101. The sound output device 155 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., PCB). According to an embodiment, the antenna module 197 may include a plurality of antennas. In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

Figure 2:
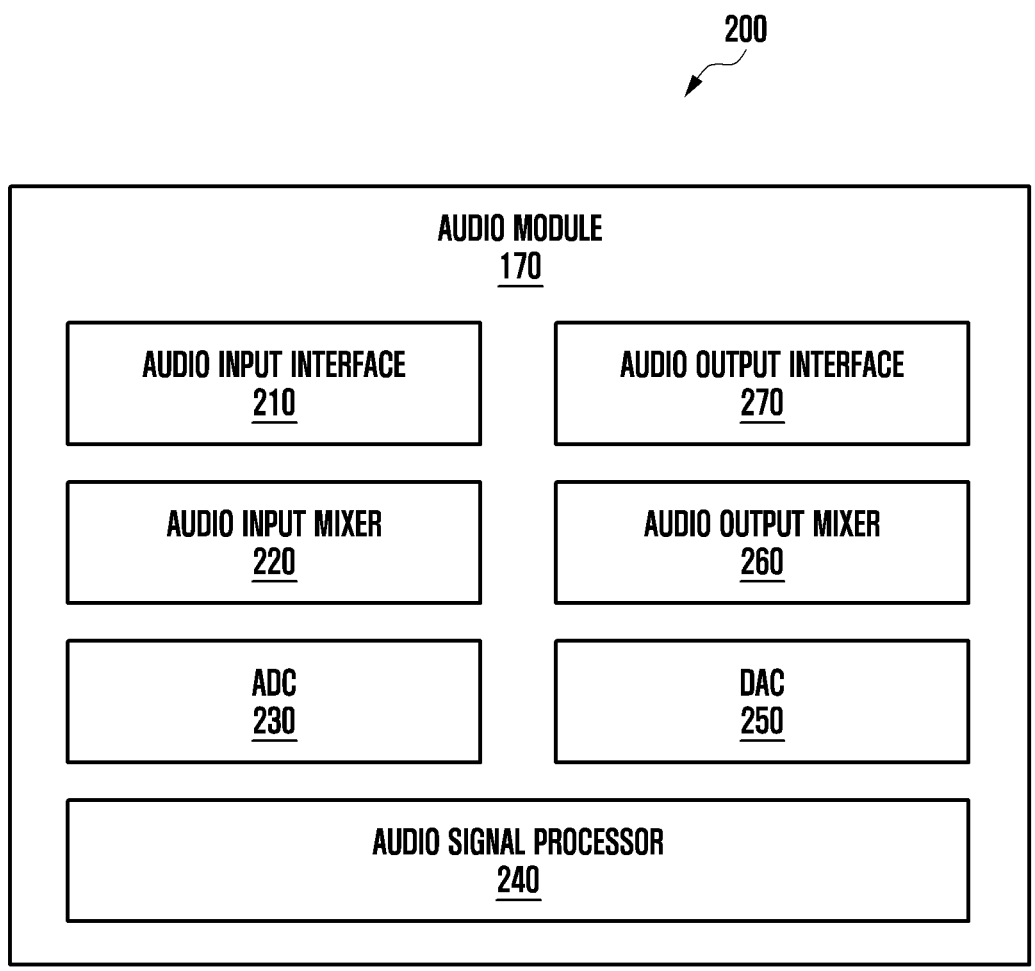
FIG. 2 is a block diagram illustrating a configuration of an audio module according to various disclosed embodiments.

FIG. 2 is a block diagram 200 illustrating the audio module 170 according to various embodiments. Referring to FIG. 2, the audio module 170 may include, for example, an audio input interface 210, an audio input mixer 220, an analog-to-digital converter (ADC) 230, an audio signal processor 240, a digital-to-analog converter (DAC) 250, an audio output mixer 260, or an audio output interface 270.

The audio input interface 210 may receive an audio signal corresponding to a sound obtained from the outside of the electronic device 101 via a microphone (e.g., a dynamic microphone, a condenser microphone, or a piezo microphone) that is configured as part of the input device 150 or separately from the electronic device 101. For example, if an audio signal is obtained from the external electronic device 102 (e.g., a headset or a microphone), the audio input interface 210 may be connected with the external electronic device 102 directly via the connecting terminal 178, or wirelessly (e.g., Bluetooth™ communication) via the wireless communication module 192 to receive the audio signal. According to an embodiment, the audio input interface 210 may receive a control signal (e.g., a volume adjustment signal received via an input button) related to the audio signal obtained from the external electronic device 102. The audio input interface 210 may include a plurality of audio input channels and may receive a different audio signal via a corresponding one of the plurality of audio input channels, respectively. According to an embodiment, additionally or alternatively, the audio input interface 210 may receive an audio signal from another component (e.g., the processor 120 or the memory 130) of the electronic device 101.

The audio input mixer 220 may synthesize a plurality of inputted audio signals into at least one audio signal. For example, according to an embodiment, the audio input mixer 220 may synthesize a plurality of analog audio signals inputted via the audio input interface 210 into at least one analog audio signal.

The ADC 230 may convert an analog audio signal into a digital audio signal. For example, according to an embodiment, the ADC 230 may convert an analog audio signal received via the audio input interface 210 or, additionally or alternatively, an analog audio signal synthesized via the audio input mixer 220 into a digital audio signal.

The audio signal processor 240 may perform various processing on a digital audio signal received via the ADC 230 or a digital audio signal received from another component of the electronic device 101. For example, according to an embodiment, the audio signal processor 240 may perform changing a sampling rate, applying one or more filters, interpolation processing, amplifying or attenuating a whole or partial frequency bandwidth, noise processing (e.g., attenuating noise or echoes), changing channels (e.g., switching between mono and stereo), mixing, or extracting a specified signal for one or more digital audio signals. According to an embodiment, one or more functions of the audio signal processor 240 may be implemented in the form of an equalizer.

The DAC 250 may convert a digital audio signal into an analog audio signal. For example, according to an embodiment, the DAC 250 may convert a digital audio signal processed by the audio signal processor 240 or a digital audio signal obtained from another component (e.g., the processor 120 or the memory 130) of the electronic device 101 into an analog audio signal.

The audio output mixer 260 may synthesize a plurality of audio signals, which are to be outputted, into at least one audio signal. For example, according to an embodiment, the audio output mixer 260 may synthesize an analog audio signal converted by the DAC 250 and another analog audio signal (e.g., an analog audio signal received via the audio input interface 210) into at least one analog audio signal.

The audio output interface 270 may output an analog audio signal converted by the DAC 250 or, additionally or alternatively, an analog audio signal synthesized by the audio output mixer 260 to the outside of the electronic device 101 via the sound output device 155. The sound output device 155 may include, for example, a speaker, such as a dynamic driver or a balanced armature driver, or a receiver. According to an embodiment, the sound output device 155 may include a plurality of speakers. In such a case, the audio output interface 270 may output audio signals having a plurality of different channels (e.g., stereo channels or 5.1 channels) via at least some of the plurality of speakers. According to an embodiment, the audio output interface 270 may be connected with the external electronic device 102 (e.g., an external speaker or a headset) directly via the connecting terminal 178 or wirelessly via the wireless communication module 192 to output an audio signal.

According to an embodiment, the audio module 170 may generate, without separately including the audio input mixer 220 or the audio output mixer 260, at least one digital audio signal by synthesizing a plurality of digital audio signals using at least one function of the audio signal processor 240.

According to an embodiment, the audio module 170 may include an audio amplifier (not shown) (e.g., a speaker amplifying circuit) that is capable of amplifying an analog audio signal inputted via the audio input interface 210 or an audio signal that is to be outputted via the audio output interface 270. According to an embodiment, the audio amplifier may be configured as a module separate from the audio module 170.

Figure 3:
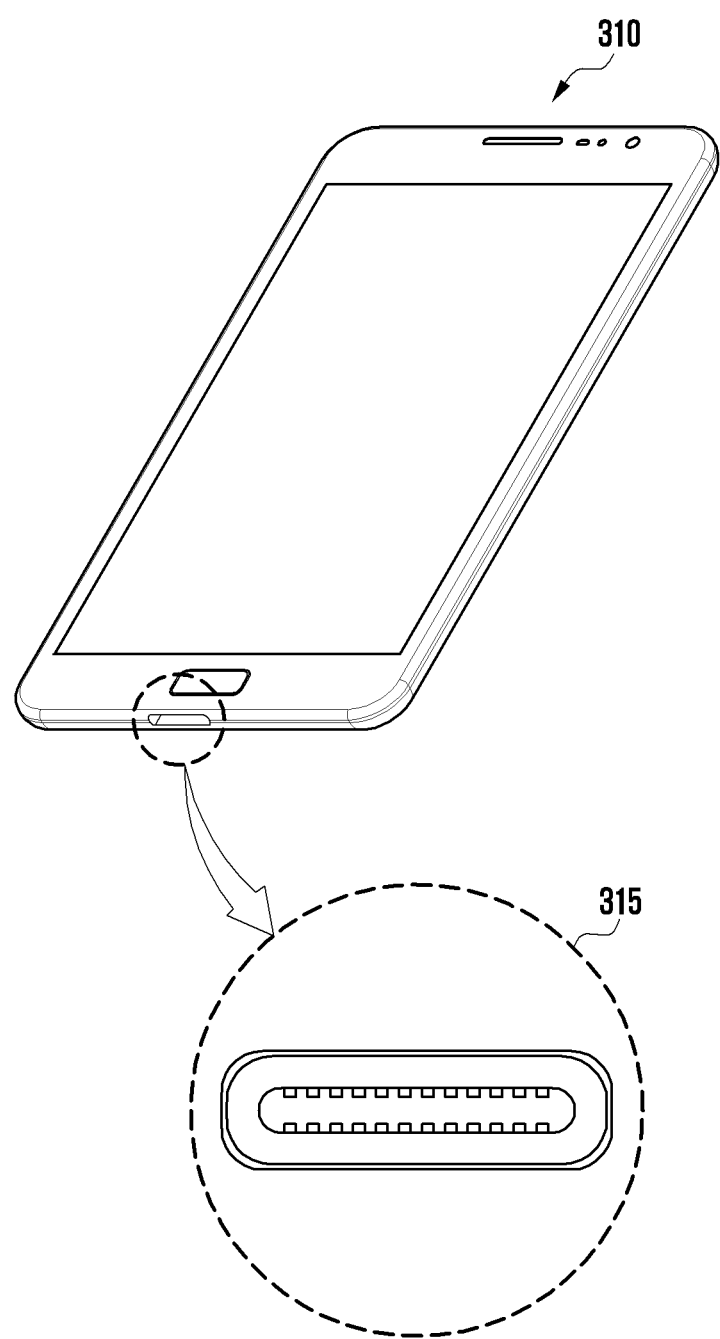
FIG. 3 is a perspective view of an electronic device having a receptacle according to a disclosed embodiment.

FIG. 3 is a perspective view of an electronic device 310 having a receptacle 315 according to a disclosed embodiment. For ease of reference, an enlarged view of the receptacle 315 is also shown.

According to an embodiment, the electronic device 310 (e.g., electronic device 101 in FIG. 1) may include the receptacle 315 (e.g., interface 177 in FIG. 1) for connection with a peripheral device. For example, the peripheral device may connect to the electronic device 310 when a plug of the peripheral device is inserted to the receptacle 315 of the electronic device 310.

In one example, the receptacle 315 may be disposed inside a hole formed on one side of a housing of the electronic device 310. The receptacle 315 may include a connection terminal (e.g., connector or connection port) with a plurality of pins.

According to an embodiment, although the receptacle 315 is disposed on the bottom side of the electronic device 310 as shown in FIG. 3, the location of the receptacle 315 is not so limited and it may be disposed on a different side of the electronic device 310.

According to an embodiment, the receptacle 315 may meet the requirements of a USB type specification. Thus, the receptacle 315 may be inserted with a plug of the peripheral device that also meets the USB type specification. Examples of USB types include USB type C.

According to an embodiment, the peripheral device being connected to the electronic device 310 via the receptacle 315 may be an audio input/output device (e.g., headset, earphone, and speaker).

According to an embodiment, the peripheral device (e.g., audio input/output device) may include a plug of a certain USB type. The peripheral device (e.g., audio input/output device) may be connected to the electronic device 310 when the USB type plug of the peripheral device is inserted into the receptacle 315 of the electronic device 301.

According to an alternative embodiment, the peripheral device (e.g., audio input/output device) may have no USB type plug and may be connected to the electronic device 310 via an adapter with a corresponding USB type plug. For example, the peripheral device (e.g., audio input/output device) may include an analog audio plug (e.g., 3.5 pi analog audio plug). The adapter may include a female audio jack that is capable of receiving the analog audio plug of the peripheral device.

In this example, the analog audio plug of the peripheral device (e.g., audio input/output device) may be connected to the adapter via the audio jack of the adapter. In turn, the adapter may have a male USB type plug that can be connected to the receptacle 315 of the electronic device 310. Thereby, the peripheral device (e.g., audio input/output device) may be electrically connected to the electronic device 310. Thus, the peripheral device (e.g., audio input/output device) and the electronic device 310 may be connected to each other via the adapter.

The electronic device 310 may transmit and receive audio signals to and from the peripheral device (e.g., audio input/output device) using at least some of the multiple pins of the connection terminal.

According to an embodiment, the peripheral device connected to the electronic device 310 via the receptacle 315 may receive power from the electronic device 310 or supply power to the electronic device 310. For example, the peripheral device may be connected to the electronic device 310 via USB type C receptacle 315 so as to be charged in fast or normal charging modes. According to an alternative embodiment, the peripheral device may include a memory for storing data. The electronic device 310 may transmit data to be stored in the memory of the peripheral device or read the data from the memory of the peripheral device. For example, the electronic device 310 may communicate data with the peripheral device via the USB interface.

Figure 4A:
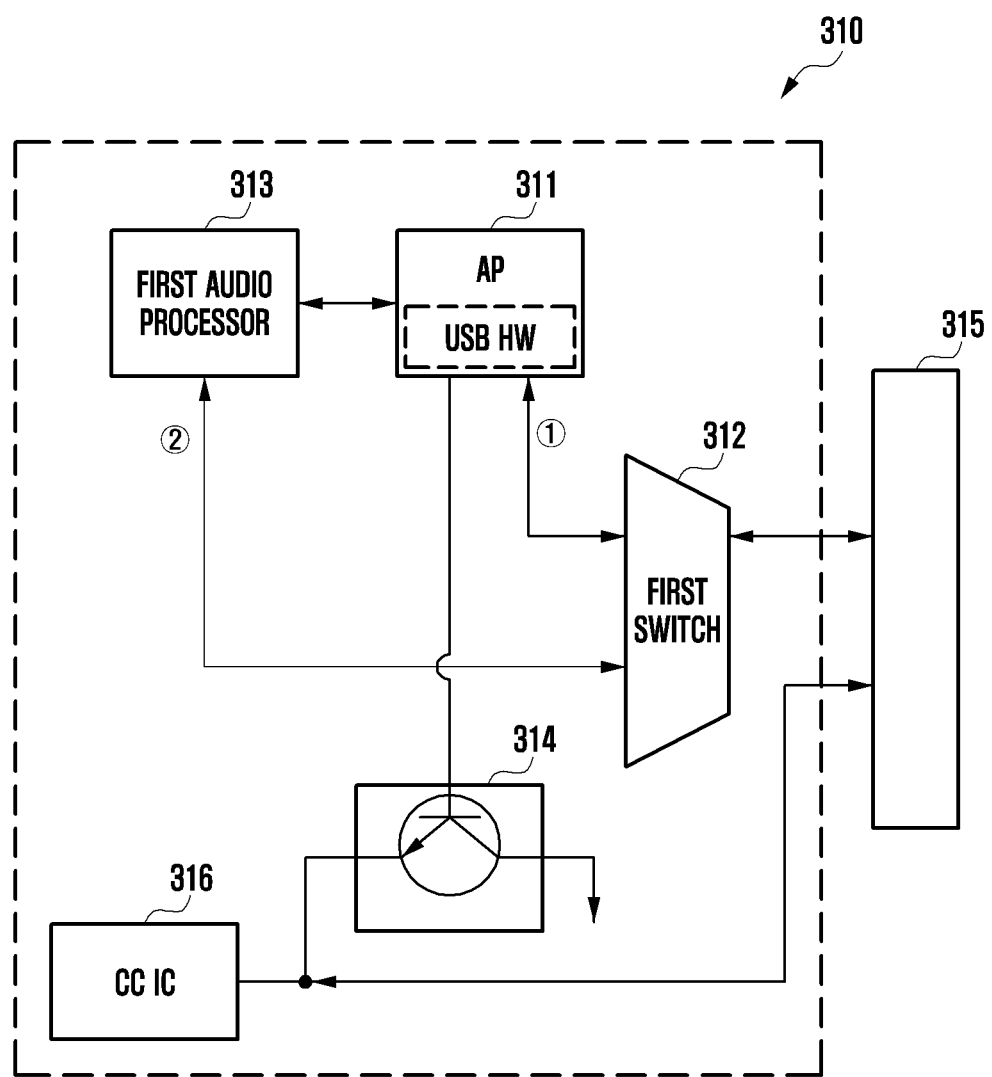
FIGS. 4A and 4B are block diagrams illustrating configurations of an electronic device and an audio input/out device, respectively, according to a disclosed embodiment.
Figure 4B:
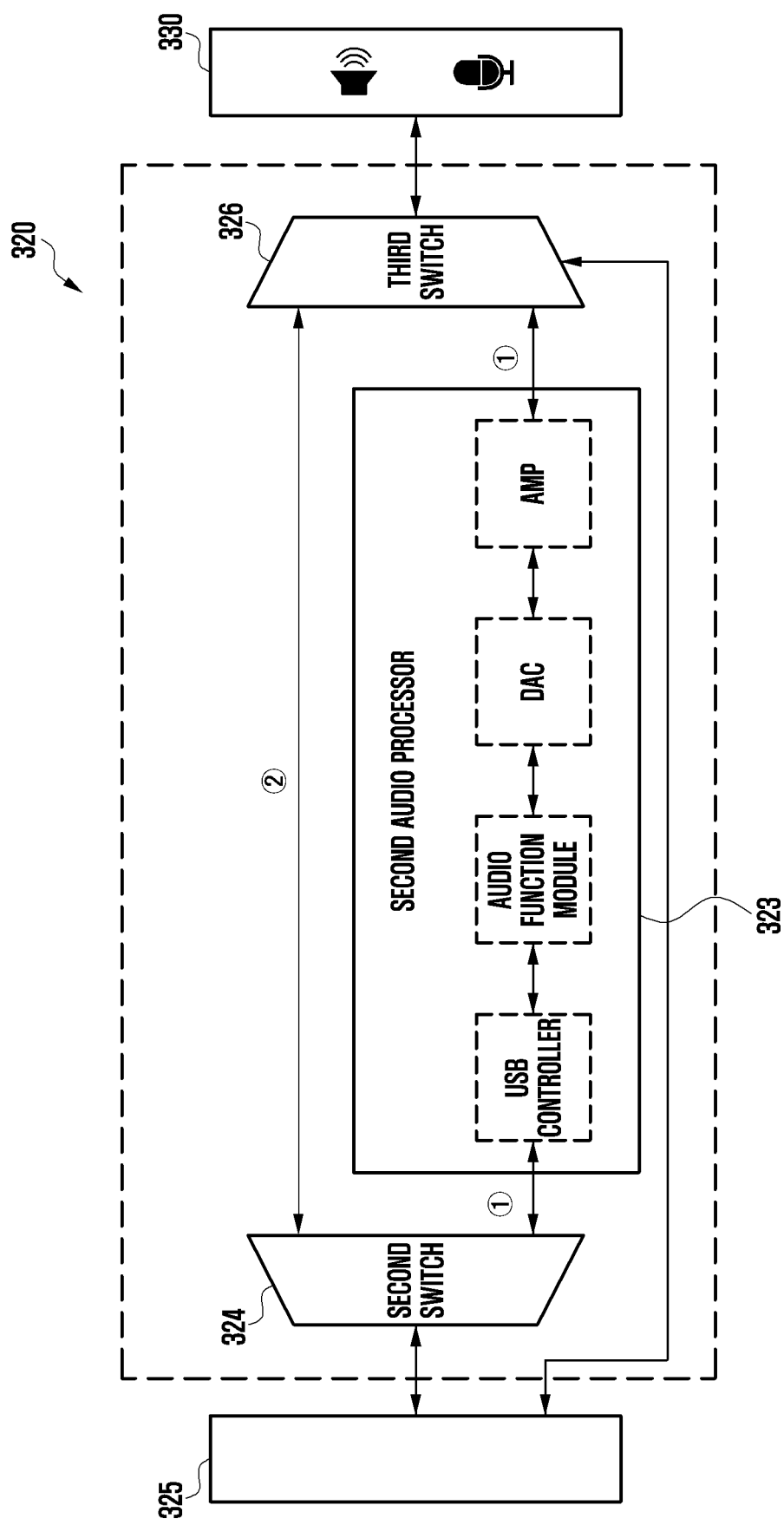

FIGS. 4A and 4B are block diagrams illustrating configurations of an electronic device 310 and an audio input/out device 320, respectively, according to a disclosed embodiment.

In the embodiment of FIG. 4A, the electronic device 310 (e.g., electronic device 101 in FIG. 1) may include a receptacle 315.

In the embodiment of FIG. 4B, the audio input/output device 320 (e.g., peripheral device in FIG. 3) may include a plug 325.

The electronic device 310 may be electrically connected to the audio input/output device 320 when the plug 325 of the audio input/output device 320 is inserted into the receptacle 315 of the electronic device 310. For example, the receptacle 315 of the electronic device 310 and the plug 325 of the audio input/output device 320 may support a certain USB standard (e.g., USB type C). The electronic device 310 may output audio signals to the audio input/output device 320 or receive audio signals from the audio input/output device 320. The audio input/output device 320 may be connected to the electronic device 310 by inserting the plug 325 into the receptacle 315 of the electronic device. When connected, data communication between the audio input/output device 320 and the electronic device 310 via the USB connection may occur. In the same embodiment, the audio input/output device 320 may be disconnected from the electronic device 310 by detaching the plug 325 from the receptacle 315 of the electronic device 310.

In the embodiment of FIG. 4B, the audio input/output device 320 may include a second audio processor (e.g., including processing circuitry) 323 for processing audio signals received via a connection terminal included in the plug 325 or audio signals detected by a microphone. For example, the second audio processor 323 may include at least one of the components of the audio module 170 of FIG. 2. In another example, the second audio processor 323 may include a USB controller (e.g., USB 2.0 controller), an audio function module (for example, support for an USB audio function topology), a digital to analog converter (DAC), an analog to digital converter (ADC), and/or an amplifier (AMP). The second audio processor 323 may convert a digital audio signal received from the electronic device 310 to an analog audio signal. Alternatively, the second audio processor 323 may convert an analog audio signal received from a microphone to a digital audio signal.

The audio input/output device 320 may include an audio input/output module 330 (e.g., speaker and microphone) that is capable of outputting or detecting audio signals. In different embodiments, the audio input/output module 330 may be configured as a module integrated with the audio input/output device 320 or as an independent module attachable/detachable to/from the audio input/output device 320.

Although not shown in the drawing, the audio input/output device 320 may further include an antenna for transmitting/receiving RF signals. For example, the plug 325 of the audio input/output device 320 may include at least one pin acting as an antenna, such as one of the GND pins (e.g., A1 pin, A12 pin, B1 pin, and B12 pin of the plug 325 of FIG. 5). In this example, the at least one pin of the plug 325 that is acting as the antenna may send an RF signal to the electronic device 310 via the receptacle 315 (e.g., at least one of the GND pins (A1 pin, A12 pin, B1 pin, and B12 pin) of the receptacle 315 in FIG. 5).

For example, the electronic device 310 may send and/or receive an RF signal via the antenna of the audio input/output device 320 connected thereto via the receptacle 315 and the plug 325. For example, the electronic device 310 may include a matching circuit component (e.g., matching component and RF tuner) (not shown) for performing impedance matching on the received RF signal. The pin of the plug 325 that is acting as the antenna may be electrically connected to the matching circuit component of the electronic device 310.

According to an embodiment, the electronic device 310 may send and/or receive an audio signal to/from the audio input/output device 320 via a connection terminal of the receptacle 325 when a connection with the audio input/output device 320 is established. For example, the electronic device 310 may exchange audio signals with the audio input/output device 320 in either a first mode or a second mode.

For example, the electronic device 310 operating in the first mode may send and/or receive digital signal (e.g., digital audio signal) and/or power to and/or from the audio input/output device 320, which is electrically connected to the electronic device 310. For example, the electronic device 310 may send and/or receive digital signal (e.g., digital audio signal) to and/or from the audio input/output device 320 via a first pin (e.g., D+ pin) and/or a second pin (e.g., D− pin) corresponding to the first pin, where the first and second pins are pins among the plurality of pins of the receptacle 315. Similarly, the electronic device may transfer power to the audio input/output device 320 via one of the multiple pins (e.g., VBUS pins) of the receptacle 315. In this example, the audio input/output device 320 may operate the second audio processor 323 or the audio input/output module 330 with the power received from the electronic device 310.

For example, the electronic device 310 may receive an RF signal via the antenna of the audio input/output device 320 while it transmits/receives digital signal (e.g., digital audio signal) and/or power to/from the audio input/output device 320. In this case, the digital signal and/or the power being communicated between the electronic device 310 and the audio input/output device 320 may cause interference in the RF signal being transmitted/received via the antenna, leading to functional degradation of the antenna.

According to an embodiment, the electronic device 310 operating in the second mode may send and/or receive analog signal (e.g., analog audio signal) to and/or from the audio input/output device 320, which is electrically connected to the electronic device 310. While in the second mode, power may not be transmitted from the electronic device 310. Thus, the audio input/output device 320 may be configured to operate in the second mode when reduction in power consumption in the electronic device 310 and/or mitigation of RF interference are desired.

In the embodiment of FIG. 4A, the electronic device 310 may include at least one processor (e.g., AP 311 and configuration channel integrated circuit (CC IC) 316 in FIG. 4A) and/or a first audio processor 313 (e.g., audio processing module 170 in FIG. 2). For example, the at least one processor of the electronic device 310 may control to establish a transmission path of audio signals in the first mode or the second mode by means of a first switch 312 and a transistor 314. The processor may include a microprocessor or any suitable type of processing circuitry, such as one or more general-purpose processors (e.g., ARM-based processors), a Digital Signal Processor (DSP), a Programmable Logic Device (PLD), an Application-Specific Integrated Circuit (ASIC), a Field-Programmable Gate Array (FPGA), a Graphical Processing Unit (GPU), a video card controller, etc. In addition, it would be recognized that when a general purpose computer accesses code for implementing the processing shown herein, the execution of the code transforms the general purpose computer into a special purpose computer for executing the processing shown herein. Certain of the functions and steps provided in the Figures may be implemented in hardware, software or a combination of both and may be performed in whole or in part within the programmed instructions of a computer. No claim element herein is to be construed under the provisions of 35 U.S.C. § 112(f), unless the element is expressly recited using the phrase "means for." In addition, an artisan understands and appreciates that a "processor" or "microprocessor" may be hardware in the claimed disclosure. Under the broadest reasonable interpretation, the appended claims are statutory subject matter in compliance with 35 U.S.C. § 101.

For example, if the electronic device 310 detects that the audio input/output device 320 is connected via the receptacle 315, it may identify the type of the audio input/output device 320. For example, the electronic device 310 may determine whether the audio input/output device 320 supports the first and/or second modes. For example, the electronic device 310 may determine whether the audio input/output device 320 supports the first and/or second modes based on the type of the audio input/out device 320.

If it is determined that the audio input/output device 320 connected to the electronic device 310 supports the first and second modes and the electronic device 310 satisfies a predetermined condition, the electronic device 310 may control the audio input/output device 320 to send and/or receive audio signals in the second mode. The predetermined condition may be satisfied when the electronic device receives a second mode execution request signal.

In the embodiment of FIG. 4A, when the electronic device 310 operates in the first mode, signals may be sent and/or received through path ① between the AP 311 and the receptacle 315. In the embodiment of FIG. 4B, when the audio input/output device 320 operates in the first mode, it may establish path ① between the plug 325 and the audio input/output module 330 via the second audio processor 323 for processing signals being received and/or to be sent. In the embodiment of FIG. 4A, path ① may be an electrical path between the AP 311 and the first switch 312. In the embodiment of FIG. 4B, path ① may be an electrical path between a second switch 324 and the second audio processor 323 and an electrical path between the second audio processor 323 and a third switch 326.

In the case where the electronic device 310 operates in the second mode, signals may flow through path ②. The electronic device 310 may send a circuit switching control signal to the audio input/output device 320 to establish path ② in the audio input/output device 320, where path ② is used for sending or receiving signals to and from the electronic device 310. For example, in the case where the audio input/output device 320 operates in the second mode, signals may be relayed between the plug 325 and the audio input/output module 330, bypassing the second audio processor 323. Thus, in this example, the signal flowing path ② may be configured to transmit analog audio signals. In the embodiment of FIG. 4A, path ② may be an electrical path between the first audio processor (e.g., including processing circuitry) 313 and the first switching 312. In the embodiment of FIG. 4B, path ② may be an electrical path between the second and third switches 324 and 326.

For example, the electronic device 310 may control the first switch 312 to switch between path ① and path ② for transceiving of signals. The electronic device 310 may send a signal path switching signal to the audio input/output device 320 based on how the signal level of the transistor 314 connected to the AP 311 is changed. For example, the electronic device 310 may control each of the second and third switches 324 and 326 of the audio input/output device 320 based on the change of the signal level of the transistor 314.

According to a disclosed embodiment, the electronic device 310 may operate in the second mode to reduce power consumption. For example, consumptive electric current of the electronic device 310 operating in the first mode may be measured to be about 126.5 mA as audio signals flow through path ① established between the electronic device 310 and the audio input/output device 320 as shown in FIGS. 4A and 4B. Meanwhile, the consumptive electric current of the electronic device 310 operating in the second mode may be measured to be about 41.3 mA as audio signals flow through path ② established between the electronic device 310 and the audio input/output device 320 as shown in FIGS. 4A and 4B. That is, the consumptive electric current of the electronic device 310 may be reduced by about 83.2 mA in the second mode as compared to the first mode.

According to a disclosed embodiment, RF signal transmission/reception performance may improve when the electronic device 310 operates in the second mode.

TABLE 1

|  | Normal mode (First mode) | Second mode | Comparison |
| --- | --- | --- | --- |
| Number of searched channels | 49 | 51 | +2 |
| Number of valid channels | 15 | 23 | +8 |

Table 1 shows the number of searched radio signal channels and the number of valid channels, which are measured per operation mode (e.g. the aforementioned first mode and the second mode). The data shown in Table 1 can be used to assess RF signal transmission/reception performance (e.g., received signal sensitivity of FM antenna) when the electronic device 310 communicates audio signals with the audio input/output device 320 in the first and second modes.

In Table 1, it is shown that the number of channels searched by the electronic device 310 in the second mode is 2 greater than that in the first mode.

In Table 1, it is shown that the number of valid channels among the channels searched by the electronic device 310 in the second mode is 8 greater than that in the first mode.

Figure 5:
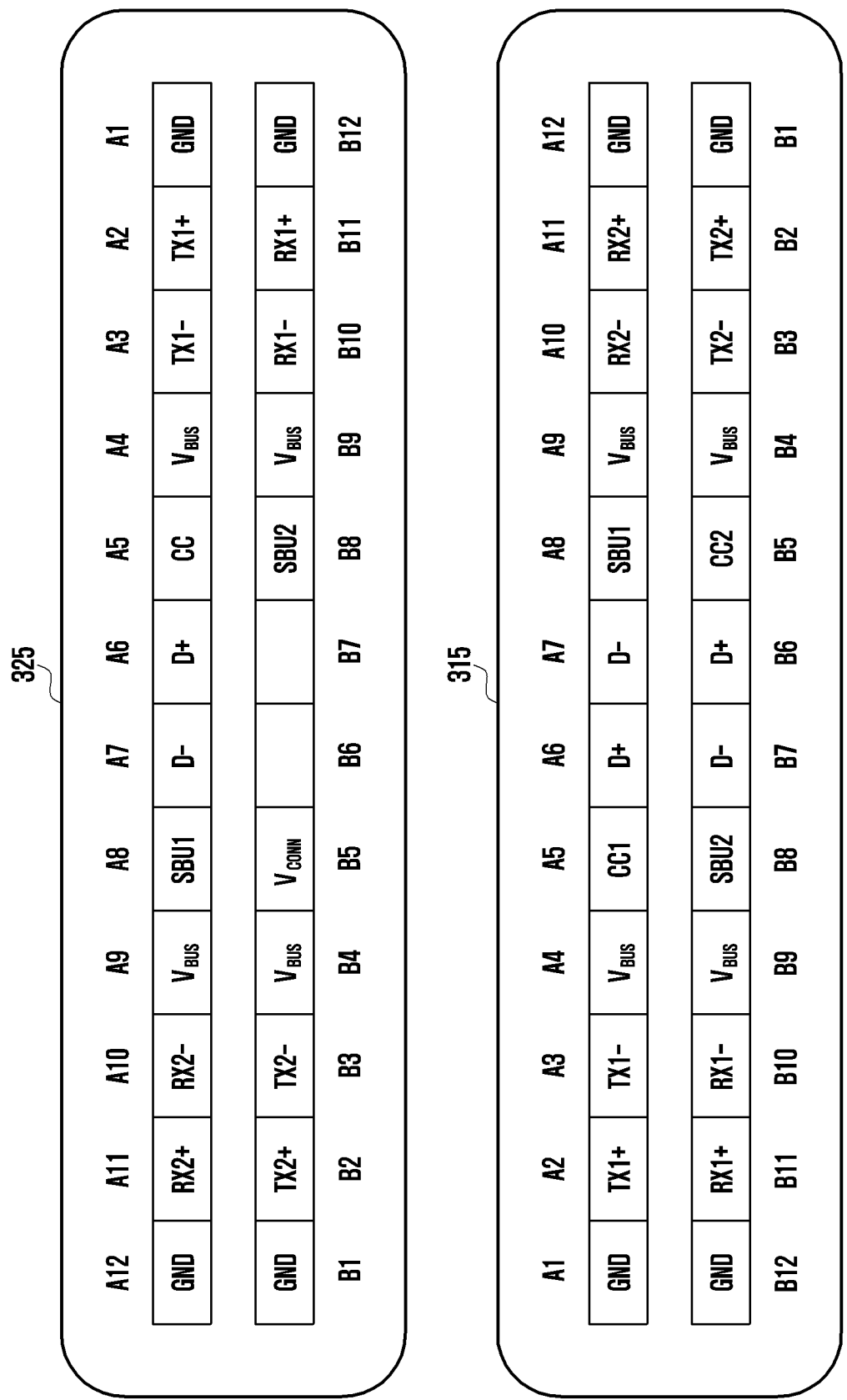
FIG. 5 is a diagram illustrating the connection terminals of the electronic device and the audio input/output device according to a disclosed embodiment.

FIG. 5 is a diagram illustrating the connection terminals of the electronic device 310 and the audio input/output device 320 according to a disclosed embodiment.

According to a disclosed embodiment, the receptacle 315 of the electronic device 310 and the plug 325 of the audio input/output device 320 connectable to the receptacle 315 may each include a connection terminal meeting the specification of a predetermined USB type. The predetermined USB type may be USB type C.

In the embodiment of FIG. 5, the receptacle 315 and the plug 325 may each include multiple pins (i.e., A1 to A12 and B1 to B12). For example, when the plug 325 is inserted into the receptacle 315, the pins of the receptacle 315 are connected with the corresponding pins of the plug 325. As an example, when the plug 325 is inserted into the receptacle 315, pin A1 (GND pin) of the plug 325 may be connected to pin A1 (GND pin) or pin B1 (GND pin) of the receptacle 315 because the pins are disposed in a rotationally-symmetrical manner, allowing the plug 325 to be reversibly inserted. Likewise, pin A3 (Tx1− pin) of the plug 325 may be connected to pin A3 (Tx1− pin) or pin B3 (Tx2− pin) of the receptacle 315.

According to an embodiment, the electronic device 310 may transmit/receive audio signal (e.g., analog audio signal or digital audio signal) to/from the audio input/output device 320 through at least one of D+ pins (A6 and B6) or D− pins (A7 and B7) of the connection terminal of the receptacle 315.

According to an embodiment, the electronic device 310 may detect a connection of an audio input/output device 320 and identify the type of the audio input/output device 320 using at least one of the CC1 pin (A5) or CC2 pin (B5) of the connection terminal of the receptacle 315. For example, at least one processor (e.g., CC IC 316 in FIG. 4A) of the electronic device 310 may identify the type of the audio input/output device 320 based on a signal received through at least one of the CC1 pin (A5) or CC2 pin (B5) of the receptacle 315. One type of the audio input/output device 320 may support fast charging. Another type may support a particular audio input/output function.

According to an embodiment, the electronic device 310 may transmit and/or receive power to/from the audio input/output device 320 through at least one of VBUS pins (A4, A9, B4, and B9) of the connection terminal of the receptacle 315.

According to an embodiment, the electronic device 310 may determine whether audio input/output device 320 supports the second mode using at least one of the sideband use 1 (SBU1) pin (A8) or the SBU2 pin (B8) of the connection terminal of the receptacle 315. As shown above, the audio input/output device 320 supporting the second mode may include a path for communicating analog audio signals (e.g., signal path in the second mode) as well as an additional path for communicating digital audio signals (e.g., signal path for first mode) and may switch between the two paths based on a signal (e.g., circuit switching control signal) received from the electronic device 310.

For example, the CC IC 316 of the electronic device 310 may determine whether the audio input/output device 320 supports the second mode using at least one of the SBU1 pin (A8) or SBU2 pin (B8). The electronic device 310 may determine whether the audio input/output device 320 supports the second mode based on a voltage value received through at least one of the SBU1 pin (A8) or SBU2 pin (B8). The electronic device 310 may determine whether the audio input/output device 320 supports the second mode based on whether the voltage value received through at least one of the SBU1 pin (A8) or SBU2 pin (B8) is equal to or greater than a first threshold voltage (e.g., 1.8 V).

According to an embodiment, the electronic device 310 may determine whether water has seeped into the receptacle 315 using at least one of the SBU pin (A8) or SBU pin (B8). For example, the electronic device may compare the voltage value acquired through at least one of the SBU pin (A8) or SBU pin (B8) with a second threshold voltage (e.g., 0.8 V) that is less than the first threshold voltage. If it is determined that the voltage value acquired through at least one of the SBU pin (A8) or SBU pin (B8) is equal to or less than the second threshold voltage, the electronic device 310 may determine that water is seeping into the receptacle 315. If it is determined that the voltage value acquired through at least one of the SBU pin (A8) or SBU pin (B8) is greater than the second threshold voltage, the electronic device 310 may determine that no water is seeping into the receptacle.

In another example, if it is determined that the voltage value acquired through at least one of the SBU pin (A8) or SBU pin (B8) is greater than the second threshold value (e.g., 0.8 V) and equal to or less than a third threshold voltage (e.g., 1.0 V), the electronic device 310 may determine that no water is seeping into the receptacle 315 and the audio input/output device 320 does not support the second mode. Alternatively, if it is determined that the voltage value acquired through at least one of the SBU pin (A8) or SBU pin (B8) is equal to or greater than the first threshold voltage (e.g., 1.8 V), the electronic device 310 may determine that no water is seeping into the receptacle 315 and the audio input/output device 310 supports the second mode.

According to an alternative embodiment, the electronic device 310 may communicate digital signals with the audio input/output device 320 through at least one of the D+ pins (A6 and B6) or D− pins (A7 and B7) and determine whether the audio input/output device 320 supports the low power mode (i.e. the second mode) based on the information (e.g., Product ID (PID) and Vendor ID (VID)) in the digital signals.

In one embodiment, the electronic device 310 may transmit a circuit switching control signal to the audio input/output device 320 through at least one of the SBU1 pin (A8) or SBU2 pin (B8). For example, the circuit switching control signal may trigger switching from the signal path for the first mode to the signal path for the second mode or from the signal path for the second mode to the signal path for the first mode in the audio input/output device 320. In this example, the circuit switching control signal may be a signal for controlling the second and third switches 324 and 326 of the audio input/output device 320. The electronic device 310 may change the signal level of the transistor 314 of the electronic device 310 to switch from the signal path for the first mode to the signal path for the second mode. For example, the second and third switches 324 and 326 of the audio input/output device 320 may be electrically connected to the transistor 314 and may be controlled to change the signal path for transmitting and/or receiving audio signals according to a change of the signal level at the transistor 314.

In one embodiment, the transistor 314 may be electrically connected to at least one of the SBU1 pin (A8) or SBU2 pin (B8) of the receptacle 315. The at least one of the SBU1 pin (A8) or SBU2 pin (B8) of the receptacle 315 may be electrically connected to at least one of the SBU1 pin (A8) or SBU2 pin (B8) of the plug 325. The at least one of the SBU1 pin (A8) or SBU2 pin (B8) of the plug 325 may be electrically connected to the second and third switches 324 and 326.

TABLE 2

| Pin number | Signal name | USB communication Plug pin use | Second mode Plug pin use | Candidate switching control signal pin |
|---|---|---|---|---|
| A1, B1 | GND | Ground (or antenna) | Ground (or antenna) | — |
| A2, B2 | Tx+ | High-speed data signal path (positive) | — | O |
| A3, B3 | Tx− | High-speed data signal path (negative) | — | O |
| A4, B4 | VBUS | Cable power bus (power supply) | Cable power bus (power supply) | — |
| A5, B5 | CC | configuration channel | configuration channel | — |
| A6, B6 | D+ | Data signal path (positive) | Analog audio signal path (right) | — |
| A7, B7 | D− | Data signal path (negative) | Analog audio signal path (left) | — |
| A8, B8 | SBUS | Auxiliary bus (secondary bus) | Circuit switching control signal path | — |
| A9, B9 | VBUS | Cable power bus (power supply) | Cable power bus (power supply) | — |
| A10, B10 | RX− | High-speed data signal path (negative) | — | O |
| A11, B11 | RX+ | High-speed data signal path (positive) | — | O |
| A12, B12 | GND | Ground (or antenna) | Ground (or antenna) | — |

Table 2 shows the uses for the various pins in the first mode (e.g. USB communication) and the second mode. Table 2 also shows that certain pins, in addition to SBU1 pin (A8) or SBU2 pin (B8), may be used to the circuit switching control signal.

For example, the electronic device 310 may transmit and/or receive data signals to and/or from the audio input/output device 320 using at least one of the D+ pin or the D− pin in the first mode. The electronic device 310 may transmit and/or receive analog audio signals to and/or from the audio input/output device 320 using at least one of the D+ pin or the D− pin in the second mode.

According to an embodiment, instead of the SBU1 pin (A8) or SBU2 pin (B8), the electronic device 310 may use another pin used for high-speed data signal paths in the USB communication mode for transmitting the circuit switching control signal, where the circuit switching control signal allows for the switching between the audio signal paths in the audio input/output device 320.

For example, the electronic device 310 may determine whether the audio input/output device 320 supports the second mode or may transmit the circuit switching control signal to the audio input/output device 320 using at least one of the Rx1+ pin (B11), the Rx1− pin (B10), the Rx2+ pin (A11), the Rx2− pin (A10), the Tx1+ pin (A2), the Tx1− pin (A3), the Tx2+ pin (B2), and/or the Tx2− pin (B3). Thus, the electronic device 310 may control the second and third switches 324 and 326 of the audio input/output device 320, when those switches are electrically connected to at least one of the Rx1+ pin (B11), Rx1− pin (B10), Rx2+ pin (A11), Rx2− pin (A10), Tx1+ pin (A2), Tx1− pin (A3), Tx2+ pin (B2), or Tx2− pin (B3).

Figure 6A:
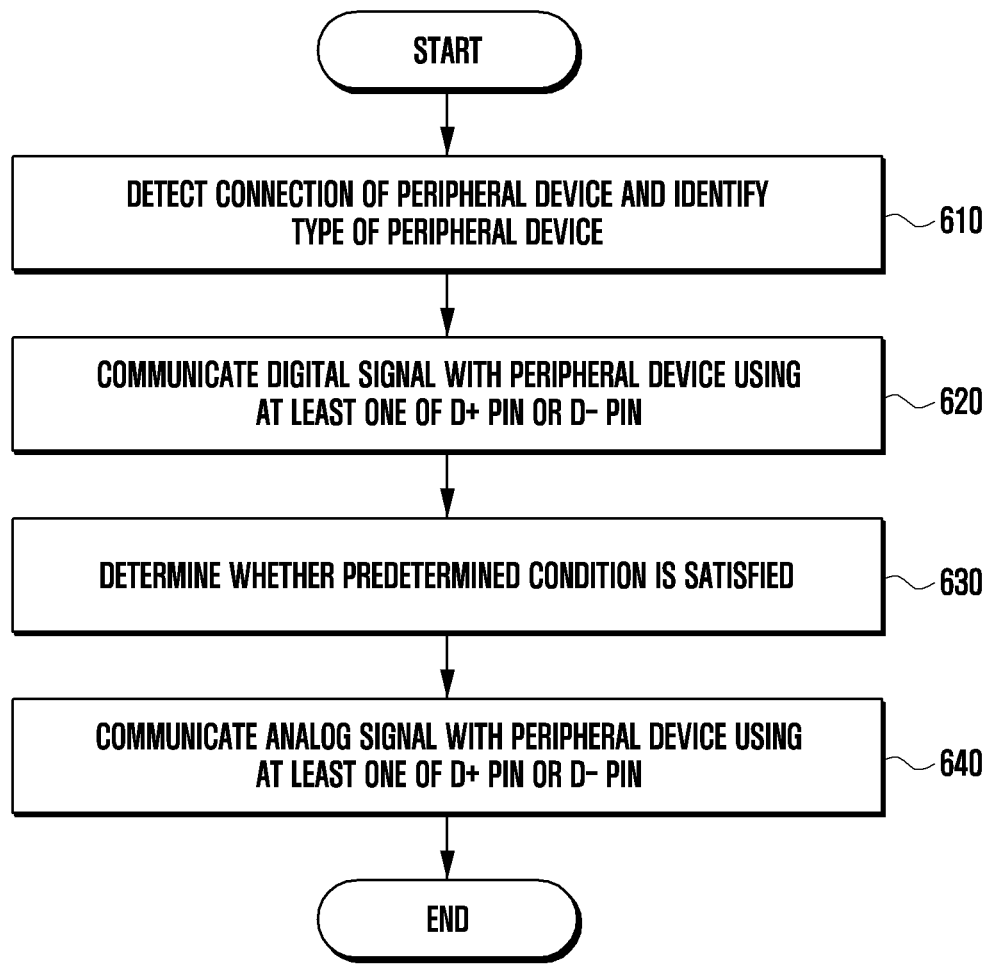
FIG. 6A is a flowchart illustrating an audio signal communication method of an electronic device according to a disclosed embodiment.

FIG. 6A is a flowchart illustrating an audio signal communication method of an electronic device according to a disclosed embodiment.

In the embodiment of FIG. 6A, at operation 610, the electronic device 310 may detect connection of a peripheral device (e.g., audio input/output device 320) thereto and identify the type of the peripheral device (e.g., audio input/output device 320).

For example, at least one processor (e.g., AP 311 or CC IC 316 in FIG. 4A) of the electronic device 310 may determine whether the peripheral device is connected to the electronic device 310 using either or both of the CC1 pin and the CC2 pin of the receptacle 315, which is of a certain USB type (e.g., USB type C). In this example, the electronic device 310 may further identify the type of the peripheral device (e.g., whether the peripheral device supports fast charging and/or a particular audio input/output function).

In one embodiment, the electronic device 310 may identify the type of the peripheral device (e.g., whether peripheral device supports the second mode) using one or more pins of the receptacle 315, such as SBU1 and SBU2 pins, Rx2− pin and Rx1− pins, Rx2+ and Rx1+ pins, Tx1− and Tx2− pins, or Tx1+ and Tx2+ pins. The electronic device 310 may operate in the first mode for communicating digital signals (e.g., audio signals) with the peripheral device. The electronic device 310 may operate in the second mode for communicating analog signals (e.g., RF signals) with the peripheral device. In the case where the peripheral device supports the first mode and the second mode, the peripheral device may selectively establish a path for digital signals being communicated with the electronic device 310 (e.g., path ① in FIG. 4B) and a path for analog signals being communicated with the electronic device 310 (e.g. path ② in FIG. 4B).

At operation 620, the electronic device 310 may communicate digital signals with the peripheral device using at least one of the first pin (e.g., D+ pin) or the second pin (e.g., D− pin) associated with the first pin in the receptacle 315 based on the type of the peripheral device. In addition, the electronic device 310 may transmit and/or receive power to/from the peripheral device using at least one of VBUS pins of the receptacle 315.

According to an embodiment, the electronic device 310 may communicate digital audio signals with the peripheral device through the first pin (e.g., D+ pin) and/or the second pin (e.g., D− pin). According to an embodiment, the electronic device 310 may transmit a control signal for transitioning a predetermined module (e.g., module related to the first mode (e.g., second audio processor 323 in FIG. 4B)) of the peripheral device to a standby mode (e.g., idle mode) through the first pin (e.g., D+ pin) and/or the second pin (e.g., D− pin).

At operation 630, the electronic device 310 may determine whether a predetermined condition is satisfied. For example, the predetermined condition may be whether a request for execution of the second mode is received. It is not mandatory for operation 630 to follow operation 620, and operation 630 may be performed in parallel with operation 610 or before or after operation 610 before operation 620.

According to an embodiment, the electronic device 310 may determine that the predetermined condition is satisfied based on the reception of a user input for communicating analog signals with the peripheral device. According to an embodiment, the predetermined condition may be satisfied when a predetermined application (e.g., application associated with RF signal communication) is executed. According to an alternative embodiment, the predetermined condition may be satisfied when the voltage of a battery (e.g., battery 189 in FIG. 1) of the electronic device 310 is less than a threshold voltage. According to another alternative embodiment, the predetermined condition may be satisfied when an audio signal with sound quality below a threshold level (e.g., 24 bit or 96 kHz) is transmitted or received.

At operation 640, if it is determined that the peripheral device supports both the first mode (e.g., mode for digital signal communication through at least one of the D+ pin or the D− pin) and the second mode (e.g., mode for analog signal communication through at least one of the D+ pin or the D− pin), and that the electronic device 310 satisfies the predetermined condition, the electronic device may communicate analog signals (e.g., RF signals) with the peripheral device through the first pin (e.g., D+ pin) and/or the second pin (e.g., D− pin).

For example, the electronic device 310 may control to switch from the signal path (e.g., path ① in FIGS. 4A and 4B) for the first mode to the signal path (e.g., path ② in FIGS. 4A and 4B) for the second mode in both the electronic device 310 and the peripheral device.

For example, if the predetermined condition is satisfied, the electronic device 310 may communicate analog signals with the peripheral device in the second mode, thereby reducing power consumption and minimizing interference to RF signals.

Figure 6B:
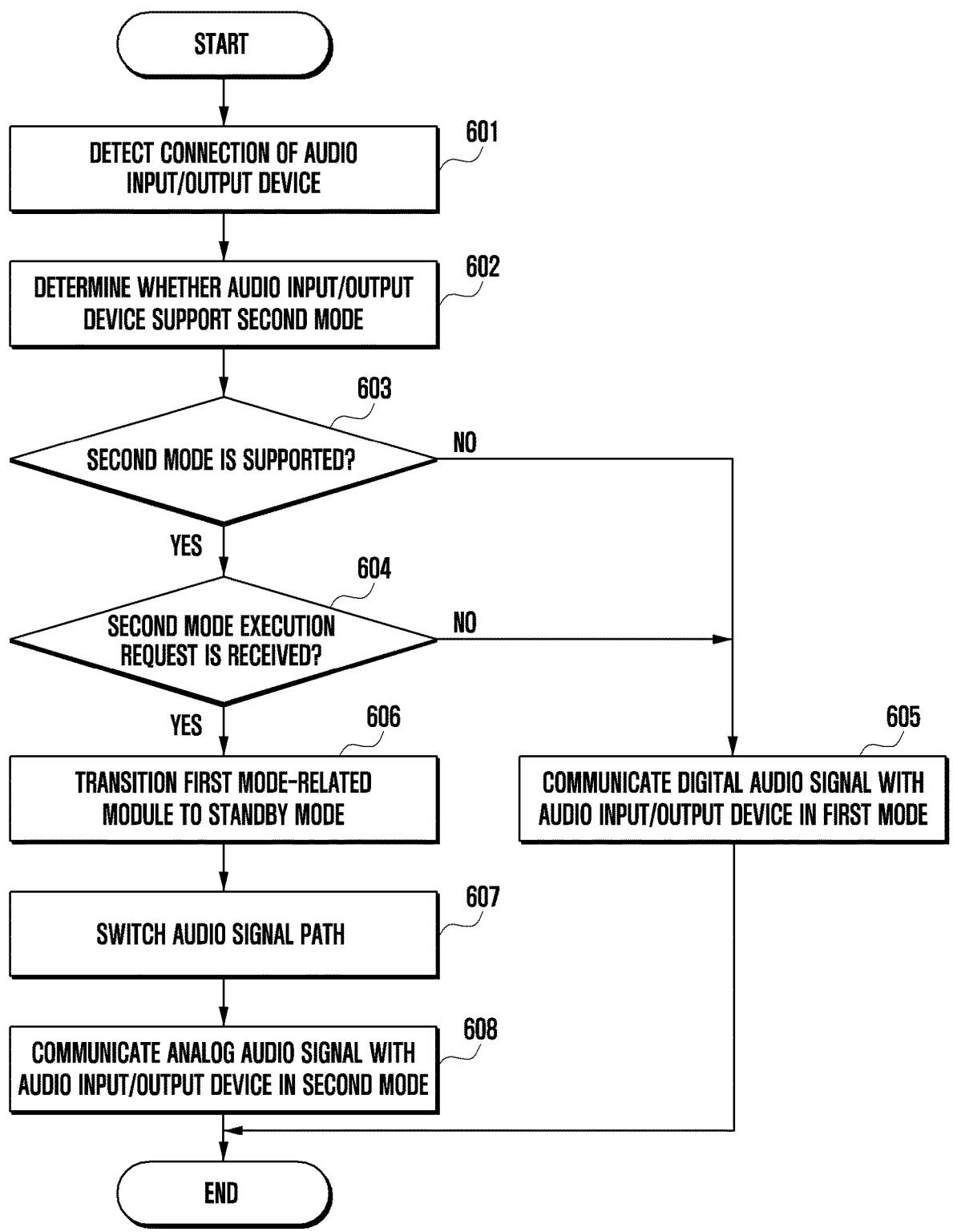
FIG. 6B is a flowchart illustrating an audio signal communication method of an electronic device according to a disclosed embodiment.

FIG. 6B is a flowchart illustrating an audio signal communication method of an electronic device according to a disclosed embodiment.

In the embodiment of FIG. 6B, at operation 601, the electronic device 310 (e.g., at least one processor of the electronic device 310) may detect a connection of a peripheral device (e.g., audio input/output device 320) to the electronic device 310.

For example, the electronic device 310 may detect the connection of the audio input/output device 320 based on a signal received through the CC1 pin and/or the CC2 pin of the receptacle 315.

At operation 602, the electronic device 310 may determine whether the audio input/output device 320 connected to the electronic device 310 supports the second mode. As explained above, the second mode may be when the electronic device 310 and the audio input/output device 320 communicate analog audio signals through a first pin (e.g., D+ pin) and/or a second pin (e.g., D− pin) associated with the first pin. For example, in the second mode, the analog audio signal output through an output terminal of the first audio processor 313 of the electronic device may be delivered to the audio input/output device 320 through the first pin (e.g., D+ pin) and/or the second pin (e.g., D− pin). The analog audio signal received from the electronic device 310 may be transferred to the audio input/output module (e.g., speaker and microphone) directly, bypassing the second audio processor 323, in the audio input/output device 320. An analog signal acquired from the audio input/output module 330 may also bypass the second audio processor 323 to be transmitted to the first audio processor 313 of the electronic device 310 through the D+ pin and/or the D− pin.

For example, the electronic device 310 may determine whether the audio input/output device 320 supports the second mode based on a signal received through the SBU1 pin (A8) and/or the SBU2 pin (B8) of the receptacle 315. In this example, the electronic device 310 may determine whether the audio input/output device 320 supports the second mode based on whether the voltage at the SBU1 pin and/or the SBU2 pin is equal to or greater than a predetermined threshold voltage. As another example, the electronic device 310 may determine whether the audio input/output device 320 supports the second mode based on a product ID (PID) or a vender ID (VID) received through the D+ pin and/or the D− pin.

According to an embodiment, if it is determined at operation 603 that the audio input/output device 320 does not support the second mode, the electronic device 310 may communicate, at operation 605, digital audio signals with the audio input/output device 320 in the first mode. For example, the first mode may be when the electronic device 310 and the audio input/output device 320 communicate digital audio signals through the first pin (e.g., D+ pin) and/or the second pin (e.g., D− pin) associated with the first pin. In this example, the digital audio signals may be transmitted and/or received through path ① being established as shown in FIGS. 4A and 4B.

According to an embodiment, if it is determined at operation 603 that the audio input/output device 320 supports the second mode, the electronic device 310 may determine at operation 604 whether a request for execution of the second mode is received.

For example, the electronic device 310 may receive a second mode execution request. The second mode execution request may be issued when a user input is made through an input device (e.g., input device 150 in FIG. 1) or a control signal is generated by the at least one processor of the electronic device 310.

For example, the second mode execution request may be received when the electronic device 301 receives a user input requesting for execution of the second mode via an input device.

In another example, the second mode execution request may be received when a predetermined application using an RF signal is executed. For example, the application may be used to listen to FM radio.

In yet another example, the second mode execution request may be received when the charged voltage level of a battery (e.g., battery 189 in FIG. 1) being less than a predetermined threshold voltage.

In still yet another example, the second mode execution request may be made based on characteristics of an audio signal requested to be output. For example, the electronic device 310 may determine at operation 604 that the second mode execution request is made when audio signal with a sound quality below a threshold condition (e.g., 24 bit or 96 kHz) being requested to be output.

According to an embodiment, at operation 605, the electronic device 310 may communicate digital audio signals with the audio input/output device 320 in the first mode when no second mode execution request is received at operation 604.

According to an embodiment, if it is determined at operation 604 that the second mode execution request is received, the electronic device 310 and the audio input/output device 320 may each transition a module associated with the first mode to a standby mode at operation 606.

For example, the electronic device 310 may transmit a signal for transitioning a second audio processor (e.g., second audio processor 323 in FIG. 4B) of the audio input/output device 320 to the standby mode to the audio input/output device 320. The signal for transitioning the second audio processor of the audio input/output device 320 to the standby mode may be transmitted through the D+ pin and/or the D− pin.

For example, the electronic device 310 may transition the second audio processor 323 of the audio input/output device 320 to the standby mode and then transition a first mode-related module (e.g., USB hardware (HW) of AP 311 in FIG. 4A) of the electronic device 310 to the standby mode At operation 607, the electronic device 310 may switch the audio signal path in the electronic device 310 and the audio input/output device 320.

For example, the electronic device 310 may change a signal level of a transistor (e.g., transistor 314 in FIG. 4A) to control the second and third switches 324 and 326 of the peripheral device through the SBU1 pin and/or the SBU2 pin of the receptacle 315. By controlling the second and third switches 324 and 326, the audio input/output device 320 may switch from the signal path for the first mode to the signal path for the second mode.

Next, the electronic device 310 may control the first switch 312 such that an analog audio signal from the audio input/output device 320 is delivered to the first audio processor 313 of the electronic device 310 or an analog audio signal from the first audio processor 313 is delivered to the audio input/output device 320 through the first pin (e.g., D+ pin) or the second pin (e.g., D− pin).

At operation 608, the electronic device 310 may communicate analog audio signals with the audio input/output device 320 in the second mode. The analog audio signals may be transmitted/received through path ② established as shown in FIGS. 4A and 4B.

Although not shown in the drawings, the electronic device 310 may receive a signal requesting for transition to the first mode while communicating analog audio signals with the audio input/output device 320 through path ② in the second mode. Such a request may be made, for example, when receiving a user input requesting execution of the first mode, when application using RF signal is terminated, when the voltage level of the battery is over a predetermined threshold voltage, or when the transmitted audio signal has a sound quality equal to or greater than a threshold level. In one embodiment, if the signal requesting for transition to the first mode is received, the electronic device 310 may control to switch back to path ① in both the electronic device 310 and the audio input/output device 320 for digital audio signal communication with the audio input/output device 320.

According to an embodiment, the proposed electronic device is advantageous in terms of communicating audio signals with a peripheral device for a music playback or recording function while minimizing power consumption of the electronic device.

According to an embodiment, the proposed electronic device is advantageous in terms of improving antenna performance by refraining from USB communication or power transmission when RF signal transmission is occurring.

The electronic device according to various embodiments may be one of various types of electronic devices. The electronic devices may include, for example, a portable communication device (e.g., a smart phone), a computer device, a portable multimedia device, a portable medical device, a camera, a wearable device, or a home appliance. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a compiler or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., Play Store™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Certain of the above-described embodiments of the present disclosure can be implemented in hardware, firmware or via the execution of software or computer code that can be stored in a recording medium such as a CD ROM, a Digital Versatile Disc (DVD), a magnetic tape, a RAM, a floppy disk, a hard disk, or a magneto-optical disk or computer code downloaded over a network originally stored on a remote recording medium or a non-transitory machine readable medium and to be stored on a local recording medium, so that the methods described herein can be rendered via such software that is stored on the recording medium using a general purpose computer, or a special processor or in programmable or dedicated hardware, such as an ASIC or FPGA. As would be understood in the art, the computer, the processor, microprocessor controller or the programmable hardware include memory components, e.g., RAM, ROM, Flash, etc. that may store or receive software or computer code that when accessed and executed by the computer, processor or hardware implement the processing methods described herein.

While the present disclosure has been shown and described with reference to various embodiments thereof, it will be understood by those skilled in the art that various changes in form and details may be made therein without departing from the present disclosure as defined by the appended claims and their equivalents.

What is claimed is:

1. An electronic device comprising:
    a universal serial bus (USB) type connection port;
    a first audio processor configured to support analog to digital conversion and digital to analog conversion; and
    at least one processor connected to the first audio processor and the USB type connection port, the at least one processor configured to:
        detect a connection of a peripheral device via the connection port,
        identify a type of the peripheral device,
        transmit digital audio signals to a speaker of the peripheral device and receive digital audio signals from a microphone of the peripheral device through a first signal path, in response to determining that the peripheral device supports only a first mode based on the type of the peripheral device,
        transmit digital audio signals to the speaker of the peripheral device and receive digital audio signals from the microphone of the peripheral device through the first signal path, in response to determining that the peripheral device supports the first mode and a second mode based on the type of the peripheral device, and an application associated with RF (radio frequency) signal communication is terminated; and
        transmit analog audio signals to the speaker of the peripheral device and receive analog audio signals from the microphone of the peripheral device through a second signal path, in response to determining that the peripheral device additionally supports the first mode and the second mode based on the type of the peripheral device, and the application associated with RF signal communication is executed.

2. The electronic device of claim 1, wherein the at least one processor is further configured to control to transmit, through the connection port and to the peripheral device, a control signal for establishing a third signal path corresponding to the second signal path in the peripheral device.

3. The electronic device of claim 2, wherein the analog signal bypasses a second audio processor of the peripheral device based on the control signal.

4. The electronic device of claim 1, wherein the USB type is USB type C.

5. The electronic device of claim 1, wherein the at least one processor is further configured to determine whether the peripheral device is connected via a configuration channel 1 (CC1) pin or a CC2 pin of the connection port.

6. The electronic device of claim 1, wherein the at least one processor is further configured to identify the type of the peripheral device using a configuration channel 1 (CC1) pin, a CC2 pin, an sideband use 1 (SBU1) pin, and/or an SBU2 pin of the connection port.

7. The electronic device of claim 1, wherein the at least one processor is further configured to:
    determine whether the peripheral device includes a third signal path corresponding to the second signal path using a SBU1 pin and/or a SBU2 pin included in the connection port, and
    transmit, to the peripheral device, a control signal for establishing the second signal path through the SBU1 pin and/or the SBU2 pin based on the peripheral device including the third signal path.

8. The electronic device of claim 7, wherein the at least one processor is further configured to determine whether the peripheral device includes the third signal path based on whether a voltage value acquired using the SBU1 pin and/or the SBU2 pin included in the connection port is equal to or greater than a threshold voltage.

9. The electronic device of claim 1, wherein the at least one processor is further configured to transmit, to the peripheral device, a control signal for establishing a fourth signal path corresponding to the first signal path or a third signal path corresponding to the second signal path in the peripheral device using an Rx1+ pin, an Rx1− pin, an Rx2+ pin, an Rx2− pin, a Tx1+ pin, a Tx1− pin, a Tx2+ pin, and/or a Tx2− pin included in the connection port.

10. The electronic device of claim 1, wherein the at least one processor is further configured to receive a radio frequency (RF) signal from an antenna of the peripheral device through one or more GND pins included in the connection port.

11. The electronic device of claim 1, wherein the second signal path is established from an output terminal of the first audio processor to the peripheral device through a D+ pin and/or a D− pin of the connection port.

12. The electronic device of claim 1, wherein the at least one processor is further configured to:
   switch from transmitting digital audio signals to the speaker of the peripheral device and receiving digital audio signals from the microphone of the peripheral device through the first signal path, in response to determining that the peripheral device supports the first mode and the second mode to transmitting analog audio signals to the speaker of the peripheral device and receiving digital audio signals from the microphone of the peripheral device through the first signal path when a predetermined condition becomes satisfied.

13. An audio signal communication method of an electronic device, the method comprising:
   detecting a connection of an audio input/output device;
   identifying a type of the audio input/output device;
   transmitting with the audio input/output device digital signals to a speaker of a peripheral device and receiving digital audio signals from a microphone of the peripheral device through a first signal path, in response to determining that the peripheral device supports only a first mode based on the type of the audio input/output device;
   transmitting digital audio signals with the audio input/output device to the speaker of the peripheral device and receiving digital audio signals from the microphone of the peripheral device through the first signal path, in response to determining that the peripheral device supports the first mode and a second mode based on the type of the audio input/output device, and an application associated with RF (radio frequency) signal communication is terminated; and
   transmitting analog signals with the audio input/output device to the speaker of the peripheral device and receiving digital audio signals from the microphone of the peripheral device through a second signal path, in response to determining that the peripheral device additionally supports the first mode and the second mode based on the type of the audio input/output device, and the application associated with RF signal communication is executed.

14. The method of claim 13, further comprising;
   transmitting, to the audio input/output device, a first control signal for transitioning a second audio processor included in the audio input/output device to a standby mode;
   transitioning a universal serial bus (USB) hardware block included in the electronic device to the standby mode; and
   transmitting, to the audio input/output device, a second control signal for establishing a third signal path corresponding to the second signal path in the audio input/output device,
   wherein the second signal path connects an output terminal of a first audio processor included in the electronic device and a D+ pin and/or a D− pin included in a connection port of the electronic device.

15. The method of claim 13, further comprising transmitting a control signal to the audio input/output device using an Rx1+ pin, an Rx1− pin, an Rx2+ pin, an Rx2− pin, a Tx1+ pin, a Tx1− pin, a Tx2+ pin, and/or a Tx2− pin included in a connection port of the electronic device.

* * * * *